United States Patent Office 2,840,555
Patented June 24, 1958

2,840,555

METHOD OF PREPARATION OF CYCLOPENTA-NOPHENANTHRENE DERIVATIVES

George Rosenkranz, Mexico City, Mexico, and Carl Djerassi, Birmingham, Mich., assignors, by mesne assignments, to Syntex, S. A., Mexico City, Mexico, a corporation of Mexico No Drawing. Original application February 17, 1953, Serial No. 337,432, now Patent No. 2,776,969, dated January 8, 1957. Divided and this application October 3, 1956, Serial No. 616,905

Claims priority, application Mexico February 19, 1952

35 Claims. (Cl. 260—239.55)

The present invention relates to novel cyclopentanophenanthrene derivatives and to a novel method for the preparation thereof.

More particularly, the present invention relates to the preparation of 11α-hydroxy steroidal sapogenin derivatives having the Ring A structure characteristic of diosgenin, as well as for the preparation of certain novel intermediates.

Diosgenin ($\Delta^5$-22-isospirosten-3β-ol) is a desirable starting material for the manufacture of sexual hormones and has so been utilized for some time since the Ring A structure thereof may be readily converted to the 3-keto $\Delta^4$ structure characterizing a great many hormones and the sapogenin side chain may be readily degraded to the side chain characterizing compounds of the pregnane series which may thereafter be converted to the various side chains characterizing the hormones. Considerable difficulty, however, has been found in producing cortical hormones which are oxygenated in Ring C from diosgenin and an ideal starting material would be a sapogenin which contained such an oxygen function at position 11 of the molecule as well as the functional groups present in the molecule of diosgenin. Sapogenins of this type, however, are heretofore unknown.

In accordance with the present invention, therefore, there has been discovered a novel method for producing 11α hydroxy derivatives having a sapogenin side chain and the Ring A structure characteristic of diosgenin. It has further been discovered in accordance with the present invention that these novel compounds may be prepared from 22-isoallospirostan-3β,11α-diol diacetate disclosed in United States patent application Serial Number 291,555, now Patent No. 2,712,027.

The novel final compounds of the present invention, as for example $\Delta^5$-22-isospirosten-3β,11α-diol and/or esters thereof are important intermediates for the production of cortical hormones having 11-oxy substituents. For example, $\Delta^5$-22-isospirosten-3β,11α-diol diacetate may be oxidatively degraded by known methods utilized for the degradation of the sapogenin side chain to $\Delta^{5,16}$-pregnadien-3β,11α-diol-20-one diacetate. The 16-double bond may then be selectively saturated by hydrogenation in the presence of a palladium catalyst and the $\Delta^5$-diester saponified to the free diol. Dibromination of the resultant $\Delta^5$-pregnen-3β,11α-diol-20-one followed by treatment with sodium iodide, followed by treatment with sodium acetate produces $\Delta^5$-pregnen-3β,11α,21-triol-20-one 21 monoacetate. Openauer oxidation of this last compound produces $\Delta^4$-pregnen-11α,21-diol-3,20-dione, 21 acetate. Oxidation with chromic acid of the 11α-hydroxy group then produces the known compound 11-dehydro corticosterone acetate.

The process of the present invention may be exemplified by the following equation:

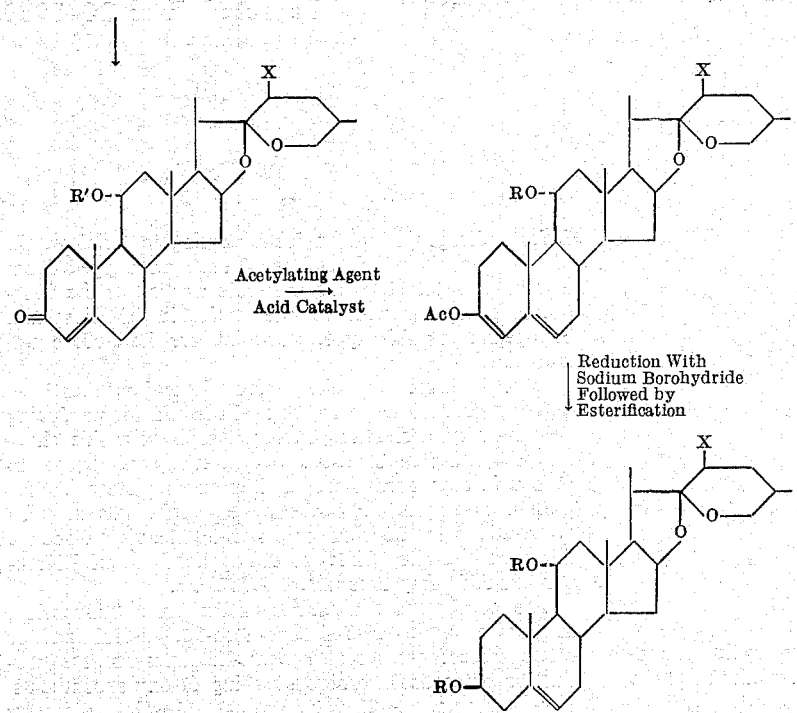

In the above equation R represents an acyl group, i. e. the residue of any organic acid customarily utilized for the esterification of steroid alcohols, preferably R represents the residue of the lower fatty acid such as acetic or propionic or the residue of an aromatic acid such as benzoic. In the above equation, further, $R^1$ represents the same acid residues as hereinbefore set forth and in addition may represent hydrogen. Ac represents the acetyl radical.

In practicing the process above outlined a suitable diester, as for example the diacetate of 22-isoallospirostan-3β,11α-diol, is treated with approximately one molar equivalent of a mild saponifying agent, as for example an alkali metal bicarbonate, to prepare the corresponding 11-mono ester, as for example the 11-mono acetate. This 11-mono acetate can then be oxidized, as for example with chromic acid N-bromoacetamide or with an aluminum alkoxide in the presence of a hydrogen acceptor, to produce the corresponding 11-mono ester of 22-isoallospirostan-11α-ol-3-one.

Before proceeding with the next step of the process, i. e. the polybromination, the mono ester may be saponified to produce the free 22-isoallospirostan-11α-ol-3-one. For the polybromination, the free compound or the ester is treated with bromine in acetic acid in the presence of a few drops of hydrobromic acid. The 2,4,23-tribromo-22-isoallospirostan-11α-ol-3-one ester or free compound which is thus obtained can then be treated with sodium iodide in a ketone solvent in order to prepare the corresponding 2-iodo-23-bromo-$\Delta^4$-22-isospirosten-11α-ol-3-one ester or the corresponding free compound. The 2-iodo-$\Delta^4$ compound thus produced can then either be completely dehalogenated or deiodinated. For the dehalogenation, a suitable agent is zinc in alcohol solution and the resultant compound is, for example $\Delta^4$-22-isospirosten-11α-ol-3-one acetate. In this particular case the X represents hydrogen.

In the alternative, instead of complete dehalogenation the 2 - iodo - 23 - bromo - $\Delta^4$ - 22 - isospirosten - 11α-ol-3-one acetate may be deiodinated. For this purpose, reducing agents such as chromous chloride, collidine, dimethylaniline or sodium bisulfite may be utilized. Other tertiary amines may also be used. The 23-bromo derivative thus produced may then be debrominated by treatment with zinc or it may be utilized as such for the next step of the present process. In the case where the compound is merely deiodinated X as shown in the above equation represents bromine.

The $\Delta^4$-22-isospirosten-11α-ol-3-one, or its 11-ester, or its 23-bromo derivative and then be treated with a suitable acetylating agent such as isopropenyl acetate or acetic anhydride in the presence of an acid catalyst to form the corresponding enol acetate. Finally, the enol acetate can be treated with sodium borohydride to produce the desired $\Delta^5$-22-isospirosten-3β,11α-diol, which is preferably esterified in situ to produce the corresponding 3,11 diester. Where the 23-bromo derivative is utilized, as will be understood, the corresponding 23-bromo-$\Delta^5$-22-isospirosten-3β,11α-diol and/or its ester is prepared. The 23-bromo derivative can then be dehalogenated by reduction with zinc as indicated in the following equation:

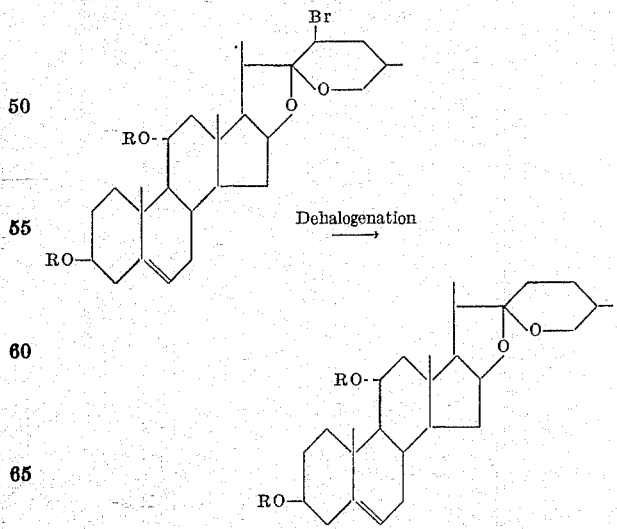

Although in the above equations and descriptions, as well as the examples which follow, the invention is illustrated with examples taken from the 22-iso series, the present invention can also be applied to the corresponding sapogenins with the normal configuration at C-22. The only difference in the case of bromination of the C-22 normal sapogenins is that an additional mol of bromine is required since these sapogenins form 23,23'- dibromo derivatives and in each case where various bromo derivatives are described in the present specification, it will be understood that where the C–22 normal sapogenins are referred to that an additional mol of bromine is present at C–23.

The following specific examples serve to illustrate but are not intended to limit the present invention:

Example I

An alcoholic solution of 22-isoallospirostan-3β,11α-diol diacetate was refluxed for 30 minutes with an aqueous solution of 1.1 molar equivalents of sodium bicarbonate (potassium bicarbonate can also be used). The mixture was poured into water and the precipitate was collected, washed to neutral, dried in air and recrystallized from methanol to yield 22-isoallospirostan-3β,11α-diol 11-monoacetate.

Example II

A solution of 1 g. of 22-isoallospirostan-3β,11α-diol 11-mono acetate in 30 cc. of glacial acetic acid maintained at 15° C., was treated with a solution of 200 mg. of chromic acid in 2 cc. of water and 10 cc. of acetic acid, which was added dropwise. The solution was stirred during 2 hours at room temperature and then poured into water. The precipitate was filtered and washed, and after recrystallization from ethyl acetate it yielded 22-isoallospirostan-11α-ol-3-one acetate.

Saponification of the acetate by refluxing with 5% methanolic potassium hydroxide yielded the free alcohol, namely 22-isoallospirostan-11α-ol-3-one.

Example III 1 g. of 22-isoallospirostan-3β,11α-diol 11-monoacetate was dissolved in a mixture of 140 cc. of toluene and 15 cc. of cyclohexanone and 40 cc. of the mixture were distilled in order to remove traces of moisture. To the boiling solution it was added a solution of 1.20 g. of aluminum isopropylate in 50 cc. of anhydrous toluene in the course of 45 minutes, maintaining a slow distillation during all this time. 20 cc. of a concentrated solution of sodium-potassium tartrate were added to the cooled solution and the mixture was subjected to steam distillation for removal of the volatile components. The mixture was extracted with ether and the ether solution was washed with water, dried over sodium sulfate and evaporated to dryness. Recrystallization of the residue from ethyl acetate yielded 22-isoallospirostan-11α-ol-3-one acetate, identical to the one obtained according to Example II.

Example IV 440 mg. of N-bromoacetamide were added in small portions to a solution of 1 g. of 22-isoallospirostan-3β,11α-diol 11-mono acetate in 25 cc. of pyridine maintaining the temperature at 20° during the operation. After standing overnight at room temperature, the solution was diluted with water and extracted with ether. The ether layer was repeatedly washed with dilute hydrochloric acid and then with sodium bicarbonate and water, dried over sodium sulfate and evaporated to dryness. The residue crystallized from ethyl acetate to yield 22-isoallospirostan-11α-ol-3-one acetate, identical to the one obtained according to Example V.

Example V

A solution of 5.6 g. of 22-isoallospirostan-11α-ol-3-one acetate in 170 cc. of glacial acetic acid was mixed with 8 drops of a 4-normal solution of hydrobromic acid in acetic acid and the mixture was treated with a solution of 7.4 g. of bromine in 75 cc. of acetic acid which was added dropwise under continuous stirring and maintaining the temperature of the solution at 22° C. After keeping the mixture overnight at room temperature in order to complete the rearrangement of the 2,2-dibromo into the more stable 2,4-dibromo configuration, it was poured into water and the precipitate was filtered and washed with water. 2,4,23-tribromo-22-isoallospirostan-11α-ol-3-one acetate was thus obtained.

Example VI

A solution of 5.2 g. of 2,4,23-tribromo-22-isoallospirostan-11α-ol-3-one acetate, such as obtained according to the previous example, and 18 g. of sodium iodide in 500 cc. of acetone was refluxed during 3 hours and then kept standing at room temperature during 72 hours. The solution was diluted with ether and washed with water, sodium thiosulfate solution, sodium bicarbonate and water, dried over sodium sulfate and evaporated to dryness. 2 - iodo - 23-bromo-Δ⁴-22-isospirosten-11α-ol-3-one acetate was thus obtained which showed an ultraviolet absorption maximum at 237 mµ (log ε 4.25) and was used without further purification for the next experiment.

Example VII

A solution of 4.1 g. of 2-iodo-23-bromo-Δ⁴-22-isospirosten-11α-ol-3-one in 1500 cc. of alcohol was refluxed with 80 g. of zinc dust during 5 hours. The solution was filtered and the residual zinc was well washed with ether. The combined filtrates were washed with water, dried over sodium sulfate and evaporated to dryness. Crystallization of the residue from chloroform-methanol yielded Δ⁴-22-isospirosten-11α-ol-3-one acetate with an ultraviolet absorption maximum at 238 mµ (log ε 4.28).

Saponification of the above acetate with 5% methanolic potassium hydroxide (sodium hydroxide can be used instead) refluxing the solution during one hour under an atmosphere of nitrogen afforded the free Δ⁴-22-isospirosten-11α-ol-3-one.

Example VIII

A solution of 3.2 g. of 2-iodo-23-bromo-Δ⁴-22-isospirosten-11α-ol-3-one acetate in 350 cc. of acetone and 100 cc. of dioxane was mixed, under an atmosphere of carbon dioxide, with a solution of chromous chloride prepared from 25 g. of chromic chloride, according to the method described by Rosenkranz, Mancera, Gatica and Djerassi, J. Am. Chem. Soc., 72, 4077 (1950). After 15 minutes, the solution was poured into water, extracted with ether, washed with sodium bicarbonate and water, dried and concentrated to a small volume until crystallization started. The precipitate was filtered, yielding 23-bromo-Δ⁴-isospirosten-11α-ol-3-one acetate with an ultraviolet absorption maximum at 238 mµ (log ε 4.28).

Example IX

A solution of 2 g. of 23-bromo-Δ⁴-22-isospirosten-11α-ol-3-one acetate in 60 cc. of alcohol was refluxed during 2 hours with 7 g. of zinc dust, and the mixture was then worked up as described in Example VII. Recrystallization from chloroform-methanol afforded Δ⁴-22-isospirosten-11α-ol-3-one acetate, identical to the one described in Example VII.

Example X

A solution of 1 g. of Δ⁴-22-isospirosten-11α-ol-3-one acetate in 60 cc. of benzene was treated with 150 mg. of p-toluenesulfonic acid and 4 cc. of isopropenyl acetate (the free Δ⁴-22-isospirosten-11α-ol-3-one can be used instead of the acetate, yielding the same result). The solution was slowly concentrated in the course of 5 hours to a final volume of 15 cc.; 4 cc. more of isopropenyl acetate were added at the end of the first hour and 2 cc. more at the end of the second and third hours. The mixture was concentrated to dryness under vacuum, diluted with ether and washed with water, sodium bicarbonate and water, dried and evaporated to dryness. The residue crystallized from a mixture of ether and acetone to which one drop of pyridine had been added. $\Delta^{3,5}$-22-isospirostadien-3,11α-diol diacetate was thus obtained, with an ultraviolet absorption maximum at 235 mμ (log ε 4.05). The infrared spectrum, determined in chloroform solution, showed a maximum at 1736 cm.$^{-1}$ (acetate) and showed no band of α,β-unsaturated keto groups.

The same reaction carried out on the corresponding 23-bromo derivative gave in this case 23-bromo-$\Delta^{3,5}$-isospirostadien-3,11α-diol diacetate with the same physical characteristics as the enol acetate described above.

Example XI $\Delta^{3,5}$-22-isospirostadien-3,11α-diol diacetate was also obtained by refluxing $\Delta^4$-22-isospirosten-11α-ol-3-one with acetic anhydride in the presence of p-toluenesulfonic acid and concentrating the solution in the course of 5 hours to one fifth of its original volume and then following the procedure described in Example X.

Example XII 1 g. of $\Delta^{3,5}$-22-isospirostadien-3,11α-diol diacetate was dissolved in 40 cc. of dioxane and 60 cc. of methanol. The solution was cooled in ice and treated with a solution of 1.6 g. of sodium borohydride in 40 cc. of methanol and 3 cc. of water, which was added in one portion. The mixture was kept overnight at a temperature of 10° C. and then heated during 30 minutes at the temperature of the steam bath. It was diluted with water and extracted with chloroform, washed, dried over sodium sulfate and evaporated to dryness. The residue was directly acetylated with pyridine and acetic anhydride to give $\Delta^5$-22-isospirosten-3β,11α-diol diacetate. This substance showed no selective absorption in the ultraviolet spectrum and in the infrared it had a band at 1736 cm.$^{-1}$, typical of acetates, and had no band of free hydroxy groups.

Saponification of this compound by refluxing with 5% methanolic sodium (or potassium) hydroxide gave the free $\Delta^5$-22-isospirosten-3β,11α-diol.

The same reaction carried out with the corresponding 23-bromo derivative gave in this case the corresponding 23-bromo-$\Delta^5$-22-isospirosten-3β,11α-diol.

Example XIII

A solution of 4 g. of 23-bromo-$\Delta^5$-22-isospirosten-3β,11α-diol diacetate in 120 cc. of alcohol was refluxed during 8 hours with 12 g. of zinc dust. The solution was filtered and evaporated to dryness. The residue crystallized from acetonehexane to give $\Delta^5$-22-isospirosten-3β,11α-diol diacetate identical to the compound obtained according to Example XII.

We claim:

1. A process for the production of an 11-mono ester of an allospirostan-11α-ol-3-one which comprises treating a corresponding diester of an allospirostan-3β,11α-diol with a molar equivalent of a mild saponifying agent to produce the corresponding 11-mono ester and oxidizing said 11-mono ester with an oxidizing agent selected from the group consisting of chromic acid, N-bromoacetamide and an aluminum alkoxide in the presence of a hydrogen acceptor.

2. A process for the production of 22-isoallospirostan-11α-ol-3-one acetate which comprises treating 22-isoallospirostan-3β,11α-diol diacetate with sodium bicarbonate to partially saponify the same and produce the corresponding 11 mono acetate and oxidizing said 11 mono acetate with an oxidizing agent selected from the group consisting of chromic acid, N-bromoacetamide and an aluminum alkoxide in the presence of a hydrogen acceptor.

3. A process for the production of 23 brominated esters of 2-iodo-$\Delta^4$-spirosten-11α-ol-3-one which comprises polybrominating a corresponding ester of an allospirostan-11α-ol-3-one to give the corresponding 2,4,23-polybromo derivative and thereafter treating said polybromo derivative with sodium iodide.

4. A process for the production of 2-iodo-23-bromo-$\Delta^4$-22-isospirosten-11α-ol-3-one acetate which comprises polybrominating 22-isoallospirostan-11α-ol-3-one acetate to give the corresponding 2,4,23-tribromo compound and reacting said tribromo compound with sodium iodide.

5. A process for the production of esters of a $\Delta^4$-spirosten-11α-ol-3-one compound which comprises reducing with zinc a corresponding 23 brominated ester of a 2-iodo-$\Delta^4$-spirosten-11α-ol-3-one compound.

6. The process of claim 5 wherein the product is $\Delta^4$-22-isospirosten-11α-ol-3-one acetate and the starting material is 2-iodo-23-bromo-$\Delta^4$-22-isoallospirosten-11α-ol-3-one acetate.

7. A process for the production of a 23 brominated ester of $\Delta^4$-spirosten-11α-ol-3-one, which comprises treating a corresponding 23 brominated ester of 2-iodo-$\Delta^4$-spirosten-11α-ol-3-one with a reducing agent selected from the class consisting of chromous chloride, a tertiary amine and sodium sulfite.

8. The process of claim 7 wherein the product is 23-bromo-$\Delta^4$-22-isospirosten-11α-ol-3-one acetate and the starting compound is 2-iodo-3-bromo-$\Delta^4$-22-isospirosten-11α-ol-3-one acetate.

9. A process for the production of a compound selected from the class consisting of a 3-acetoxy-11α-acyloxy-$\Delta^{3,5}$-spirostadien compound, a 3,11α-diacetoxy-$\Delta^{3,5}$-spirostadien compound and 23 brominated derivatives thereof which comprises treating the corresponding compound selected respectively from the class consisting of an ester of a $\Delta^4$-spirosten-11α-ol-3-one, a $\Delta^4$-spirosten-11α-ol-3-one, and its 23 bromo derivatives with an acetylating agent in the presence of an acid catalyst.

10. The process of claim 9 wherein the acetylating agent is selected from the class consisting of isopropenyl acetate and acetic anhydride.

11. A process for the production of a diester selected from the class consisting of diesters of $\Delta^5$-spirosten-3β,11α-diol and 23 bromo derivatives thereof, which comprises treating a compound selected from the class consisting of 3-acetoxy-11α-acyloxy-$\Delta^{3,5}$-spirostadien and 23 brominated derivatives thereof with sodium borohydride followed by esterification.

12. The process of claim 11 wherein the product is $\Delta^5$-22-isospirosten-3β,11α-diol diacetate and the starting compound is $\Delta^{3,5}$-22-isospirostadien-3,11α-diol diacetate and the esterification is an acetylation.

13. The process of claim 12 wherein the product is 23-bromo-$\Delta^5$-22-isospirosten-3β,11α-diol diacetate and the starting compound is 23-bromo-$\Delta^{3,5}$-22-isospirostadien-3,11α-diol diacetate and the esterification is an acetylation.

14. 11-mono esters of an allospirostan-3β,11α-diol.

15. 22-isoallospirostan-3β,11α-diol 11-mono acetate.

16. A new compound selected from the group consisting of allospirostan-11α-ol-3-one and esters thereof.

17. A new compound selected from the class consisting of 22-isoallospirostan-11α-ol-3-one and esters thereof.

18. Allospirostan-11α-ol-3-one acetate.

19. Allospirostan-11α-ol-3-one.

20. A new compound selected from the class consisting of 2,4,23-polybromo-allospirostan-11α-ol-3-one and esters thereof.

21. 2,4,23 - tribromo - 22-isoallospirostan-11α-ol-3-one acetate.

22. A new compound selected from the group consisting of 23 brominated 2-iodo-$\Delta^4$-spirosten-11α-ol-3-one compounds and esters thereof.

23. 2-iodo-23-bromo-$\Delta^4$-22-isospirosten-11α-ol-3-one acetate.

24. A new compound selected from the group consisting of 23-brominated $\Delta^4$-spirosten-11α-ol-3-one compounds and esters thereof.

25. 23-bromo-$\Delta^4$-22-isospirosten-11α-ol-3-one acetate.

26. A new compound selected from the group consisting of Δ⁴-spirosten-11α-ol-3-one compounds and esters thereof.

27. Δ⁴-22-isospirosten-11α-ol-3-one.
28. Δ⁴-22-isospirosten-11α-ol-3-one acetate.
29. A 23 brominated $\Delta^{3,5}$-spirostadien-3,11α-diol diacetate.
30. 23 - bromo - $\Delta^{3,5}$-22 - isospirostadien - 3,11α-diol diacetate.
31. A diester of $\Delta^{3,5}$-spirostadien-3,11α-diol.
32. $\Delta^{3,5}$-22-isospirostadien-3-11α-diol diacetate.
33. A compound selected from the group consisting of a 23 brominated $\Delta^5$-spirosten-3β,11α-diol compound and esters thereof.
34. 23-bromo-$\Delta^5$-22-isospirosten-3β,11α-diol.
35. 23-bromo-$\Delta^5$-22-isospirosten-3β,11α-diol diacetate.

No references cited.